Sept. 30, 1958 L. C. RUTH 2,854,592

HIGH VOLTAGE REGULATION CIRCUIT

Filed April 27, 1953 2 Sheets-Sheet 1

LINUS C. RUTH
*INVENTOR.*
BY [signature]
HIS ATTORNEY

Sept. 30, 1958 L. C. RUTH 2,854,592

HIGH VOLTAGE REGULATION CIRCUIT

Filed April 27, 1953 2 Sheets-Sheet 2

LINUS C. RUTH

*INVENTOR.*

*BY* Bruce L. Birchard

HIS ATTORNEY 2,854,592

HIGH VOLTAGE REGULATION CIRCUIT

Linus C. Ruth, Sierra Madre, Calif., assignor to Hoffman Electronics Corporation, a corporation of California Application April 27, 1953, Serial No. 351,190

6 Claims. (Cl. 307—150)

This invention relates to improvements in the circuitry for apparatus utilizing cathode ray tubes for the display of information. More specifically, this invention relates to improved high voltage apparatus for television receivers.

In present day television apparatus a common and undesirable phenomenon occurs upon the adjustment of the brightness control in the receiver. The effect of such adjustment in the direction of increasing the brightness is, as a result of the poor regulation in the normal high voltage supply, to increase the brightness in less than the expected amount and to simultaneously reduce the width of the picture and destroy the focus of the image appearing on the screen of the television receiver. This effect is aggravating in black and white television but in the operation of color television apparatus it may completely destroy color fidelity and render the image reproduced on the screen of the television receiver totally unsatisfactory. This latter effect in color television receivers results from the particular characteristics of color television reproduction which require the registration or super-position of several images to produce the final multicolor image with any fidelity. Satisfactory means for preventing these phenomena have not yet been provided.

Therefore, it is an object of this invention to provide an improved high voltage system for television receivers or the like.

It is a further object of this invention to provide a high voltage system delivering at its output terminal a substantially continuous uni-directional potential.

It is a still further object of this invention to provide a simple and economical voltage regulator circuit for application to the high voltage supply of a television receiver or the like.

Figure 1:
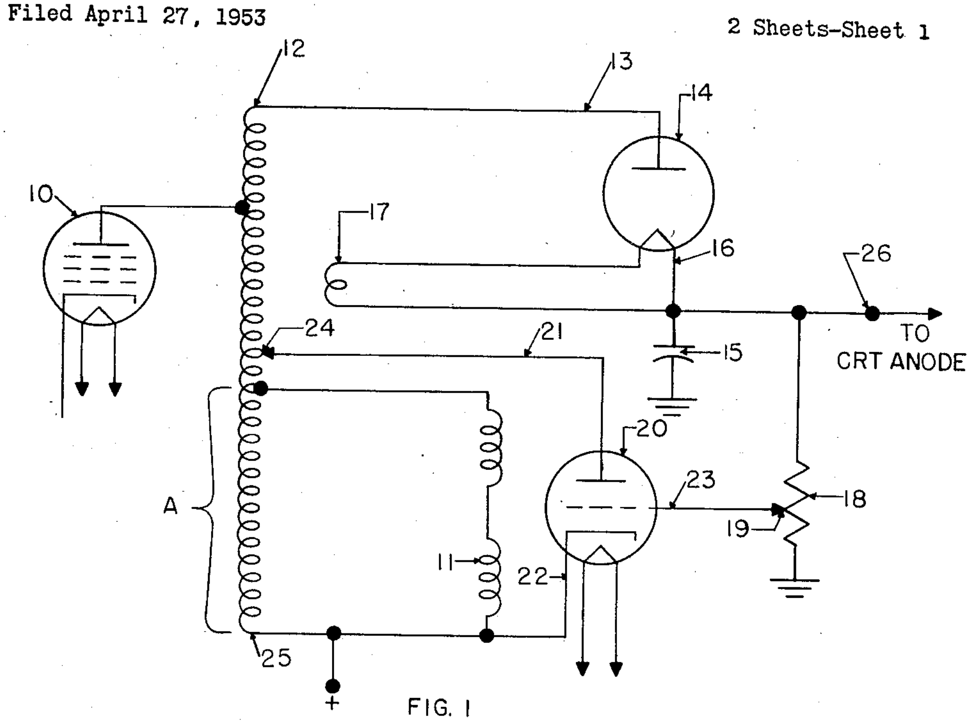
Figure 2:
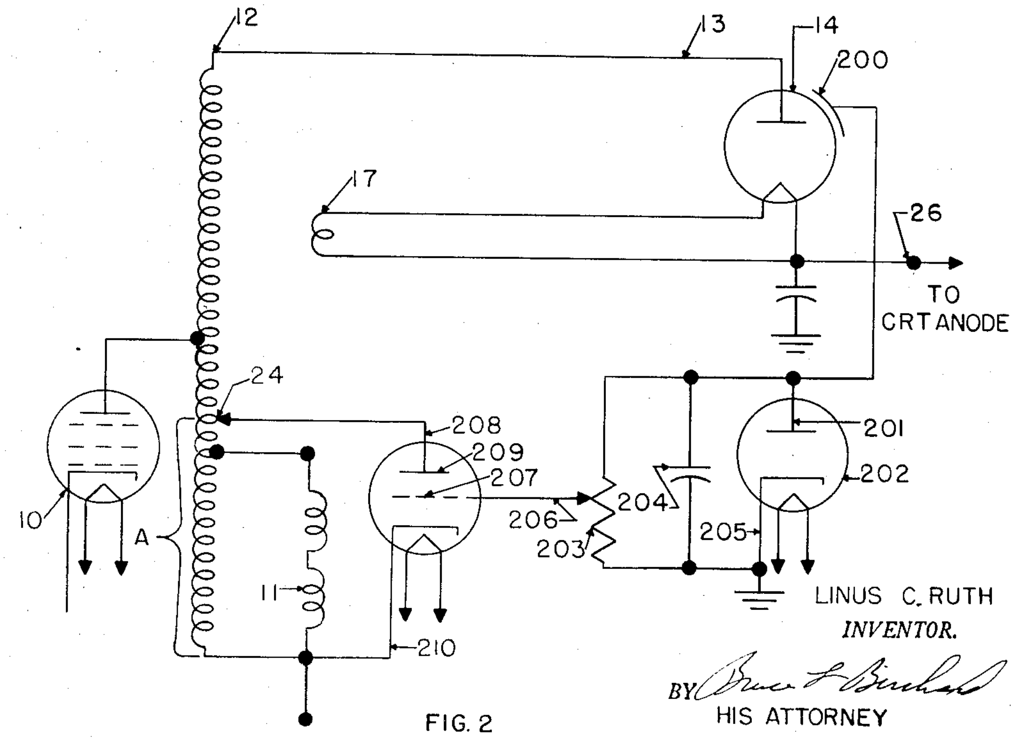
Figure 3:
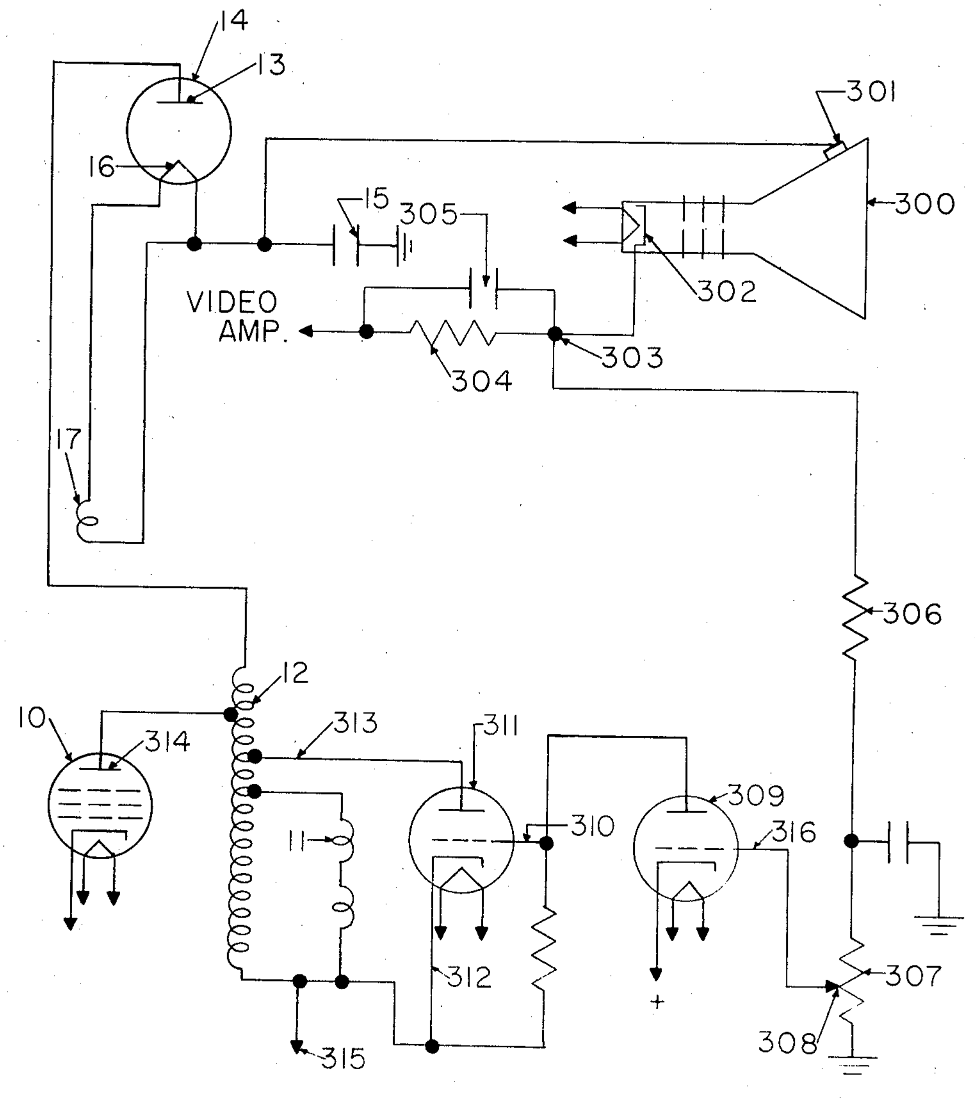

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawings, in which:

Figure 1 is a schematic diagram showing a first embodiment of the present invention; and Figure 2 is a schematic diagram of a second embodiment of the present invention; and Figure 3 is a schematic diagram of a third embodiment of the present invention.

In Figure 1, electron discharge device 10 is the conventional output amplifier tube of the horizontal sweep circuit and supplies power of the appropriate wave form to horizontal yoke 11 through transformer 12, which may be an auto-transformer or a two-winding transformer. A high alternating or fluctuating potential is applied to anode 13 of rectifier 14 from transformer 12 through the well-known fly-back action which results when output tube 10 is cut off. As a result of the rectifying action of rectifier 14, a high, substantially continuous uni-directional potential appears across condenser 15 which is connected between filament 16 and ground or reference potential. Heating potential for that filament is derived in conventional fashion by means of a small secondary winding 17 on transformer 12. Potentiometer 18 shunts condenser 15 and provides at its output terminal 19 a reduced uni-directional potential, the magnitude of which may be chosen in the fashion described hereinafter. Electron discharge device 20 is provided having anode 21, cathode 22 and control electrode 23. Anode 21 is connected to a first tap 24 on transformer 12. Cathode 22 is connected to a second tap 25 on transformer 12. The positions of taps 24 and 25 are selected so that during the re-trace or fly-back period there appears between anode 21 and cathode 22 a potential lying in the normal operating range of electron discharge device 20. The position of adjustable terminal 19 on potentiometer 18 is adjusted so that, with the desired uni-directional potential appearing at output terminal 26 when that terminal is connected to the anode of the cathode ray tube to be operated, electron discharge device 20 is on the border of conduction but is not, in fact, conducting.

In practice, the circuit operates as follows: when the brightness control in the television receiver is adjusted for decreased brightness, there is a reduction in the beam current flowing to the cathode ray tube from terminal 26 of the high voltage supply. Consequently, the current flowing in transformer 12 is reduced and, as a result, there is a decrease in the resistive voltage drop in the windings of transformer 12. This causes an increase in the alternating potential appearing at the anode 13 of rectifier 14 and the potential appearing at output terminal 26 tends to increase. However, a portion of this increased potential is applied to the control electrode 23 of electron discharge device 20 through voltage divider 18. If the setting of adjustable terminal 19 is correct, this increase in potential will cause electron discharge device 20 to conduct. A resultant low impedance load will now appear across transformer 12, substantially short-circuiting a portion of the windings thereof and the alternating potential at the anode 13 of rectifier 14 will drop accordingly. By proper adjustment of the position of terminal 24 on transformer 12, the potential reducing action produced by conduction of electron discharge device 20 will exactly counteract the increase brought about by a reduction in the beam current of the cathode ray tube constituting the load for the power supply. The picture on the cathode ray tube will remain in focus and the width of the picture will not increase, all as a result of the regulating action produced by electron discharge device 20. Electron discharge device 20 may be considered a variable load device shunting a portion of transformer 12. Obviously, as the increment of uni-directional potential increases, the degree of conduction in electron discharge device 20 will increase, within limits of saturation, thus increasing the load on transformer 12 and producing a greater voltage stabilizing effect.

Electron discharge device 20 must be chosen so as to have sufficient plate dissipation to absorb, during the periods when the cathode ray tube is cut off, the power normally flowing into the anode of the cathode ray tube. This power may be in the order of five watts. Merely by way of example, the two halves of a 6SN7 may be connected in parallel to meet the requirements of this circuit when it is utilized in a conventional television receiver.

In Figure 2, electron discharge device 10 serves the same function as in the circuit of Figure 1 and supplies power to horizontal yoke 11. During the fly-back phase of operation of electron discharge device 10, a high pulsating potential is developed across transformer 12, as described before, and appears at anode 13 of rectifier 14. A high uni-directional continuous potential appears at terminal 26, as before. Capacitor plate 200, which may take the form of tin foil, is applied to the envelope of electron discharge device 14. This capacitor plate is connected to anode 201 of a second rectifier 202. A shunt connected combination of resistance 203 and capacitance 204 is connected between anode 201 and cathode 205 of rectifier 202. Resistance 203 has an output terminal 206 variably positioned thereon. This terminal 206 is connected to control electrode 207 of control tube 208. Anode 209 and cathode 210 of control tube 208 are connected at separated points along the windings of transformer 12.

The operation of this circuit is as follows: When the high pulsating potential, resulting from fly-back action in transformer 12, appears at anode 13 of rectifier 14, a portion of that potential appears on capacitor plate 200 and, consequently, on anode 201 of the second rectifier 202. There it is rectified and appears across resistor 203. A portion of the continuous uni-directional potential so produced is applied to control electrode 207 from terminal 206. The circuit is adjusted so that with the minimum anode voltage required by the cathode ray tube appearing at terminal 26, control tube 208 is on the verge of conducting. When, as a result of adjusting the brightness control in the receiver for reduced brightness, the amplitude of the fly-back voltage applied to anode 13 increases, there is a corresponding increase in the potential appearing at the anode 201 of rectifier 202. Consequently, there is an increase in the continuous uni-directional potential applied to control electrode 207 of control tube 208 and that tube begins conduction with a resultant shunting of a portion of the current in transformer 12 and a reduction in the amplitude of the fly-back alternating or pulsating potential appearing at anode 13 of rectifier 14. The number of windings A across which control tube 208 is connected is adjusted so that, at the outset, the potential which appears between anode 209 and cathode 210 of control tube 208 during fly-back is within a reasonable operating range for control tube 208. Additional adjustments of the position of tap 24 and adjustable terminal 206 may be made so that the desired degree of voltage regulation is obtained.

In Figure 3, electron discharge device 10 supplies the appropriate sweep power to yoke 11 through transformer 12, as described in connection with Figures 1 and 2. The high pulsating or fluctuating voltage developed upon the cutting off of electron discharge device 10 appears at anode 13 of rectifier 14. A high, substantially continuous uni-directional potential appears across condenser 15 which is connected between filament 16 and ground or reference potential. Heating potential for that filament is derived in conventional fashion from secondary winding 17 on transformer 12. The D. C. potential developed across condenser 15 is applied to the final anode of cathode ray tube 300 through terminal 301. Heater current for that tube is supplied from a source not shown and when grid 302 of the cathode ray tube 300 has such a potential applied to it that beam current is permitted to flow, a potential with respect to ground appears at terminal 303 which forms the junction between a connection from cathode 302 and the video input network comprising resistor 304 and condenser 305. This potential results from the flow of cathode current through resistors 306 and 307, the latter having a variable tap 308 thereon. The D. C. potential appearing at this variable tap 308 is reversed in polarity through D. C. amplifier stage 309 and applied to grid 310 of control tube 311. Cathode 312 and plate 313 of control tube 311 are connected at separated points on transformer 12. These tube elements may be connected directly across yoke 11 to reduce circulating currents. Operating potential for the anode 314 of drive tube 10 is supplied through terminal 315.

The operation of this circuit is as follows. The position of the points at which cathode 312 and anode 313 are connected to transformer 12 are chosen so that during the fly-back period, the potential appearing between anode 313 and cathode 312 of control tube 311 lies in the normal operating range of that tube. The position of tap 308 is then adjusted so that with the minimum desirable anode potential appearing at terminal 301, control tube 311 is on the verge of conduction but is not, in fact, conducting. When the brightness control of the receiver is adjusted for reduced brightness, the sweep power tends to increase and the picture appearing on the screen of cathode ray tube 300 tends to fall out of focus and partially over the sides of the cathode ray tube. Simultaneously, however, the current flowing in the cathode of cathode ray tube 300 and, hence, through resistor 307, is reduced. This results in a reduction in the positive potential appearing on grid 316 of inverter tube 309 with a resultant increase in the positive potential appearing on grid 310 of control tube 311. This tube now tends to conduct and shunts a portion of the current normally flowing in the windings of transformer 12, thus reducing the power which flows to the horizontal deflection yoke 11 and tending to keep the beam in focus on the screen and the picture information presented within the screen area of the cathode ray tube.

Although the foregoing discussion has dealt with the voltage regulator of this invention as applied to a "fly-back" type of high voltage system, it is apparent that it would be equally applicable to an R. F. type of high voltage power supply.

It is apparent from the foregoing description that there have been provided voltage regulator circuits for the high voltage systems associated with apparatus utilizing cathode ray tubes, such voltage regulator circuits being simple and effective in their operation. The problems of loss of focus and variations in raster width which normally accompany the adjustment of the brightness control in modern television receivers are totally eliminated by the use of either of the circuits described herein.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a voltage regulating circuit for a combined deflection sweep and high voltage direct current supply for cathode ray tubes and the like, said supply being of the type including an oscillator, a step-up transformer connected to the output of said oscillator and having separate transformer output terminals connected to a high voltage rectifier and to a deflection sweep circuit respectively; said supply thus being subject to undesired interaction between the current drawn through said rectifier and the voltage applied to said deflection sweep circuit; the improvement which comprises a controllable power dissipating device connected across a portion only of the output winding of said transformer, a voltage dividing network connected between a point of direct current reference potential and the high voltage output terminal of said rectifier, and a control circuit for said power dissipating device connected between said power dissipating device and an intermediate point of said network.

2. A voltage regulating circuit in accordance with claim 1, in which said transformer is an auto-transformer having said oscillator output connected to a point of its winding which is intermediate of the transformer output terminals.

3. A voltage regulating circuit in accordance with claim 1, in which said power dissipating device is a space discharge device having a control electrode, its space current terminals being connected across said portion of the transformer output winding and its control electrode being connected to said intermediate point of the dividing network.

4. A voltage regulating circuit in accordance with claim 1, in which said power dissipating device is a thermionic vacuum tube having at least anode and cathode electrodes connected across said portion of the output winding of said transformer, and having a control electrode connected to said intermediate point of the dividing network.

5. A voltage regulating circuit in accordance with claim 1, in which said control circuit for the power dissipating device includes a voltage amplifier.

6. In a voltage regulating circuit for a high voltage direct current supply for cathode ray tubes and the like, said supply being of the type including an oscillator, a step-up transformer connected to the output of said oscillator and having transformer output terminals connected to a high voltage rectifier; said supply thus being subject to undesired variations in its output voltage due to variations in the current drawn through said rectifier; the improvement which comprises a controllable power dissipating device connected across a portion only of the output winding of said transformer, a voltage dividing network connected between a point of direct current reference potential and the high voltage output terminal of said rectifier, and a control circuit for said power dissipating device connected between said power dissipating device and an intermediate point of said network.

References Cited in the file of this patent

UNITED STATES PATENTS

| | | |
|---|---|---|
| 2,435,961 | Gibbons | Feb. 17, 1948 |
| 2,459,638 | Fyler | Jan. 18, 1949 |
| 2,535,651 | Newman | Dec. 26, 1950 |
| 2,555,449 | Kucharski | June 5, 1951 |
| 2,565,621 | Olson | Aug. 28, 1951 |
| 2,644,917 | Smith | July 7, 1953 |
| 2,700,747 | Finkelstein | Jan. 25, 1955 |
| 2,801,379 | Rosenberg | July 30, 1957 |